United States Patent
Azuma

(10) Patent No.: US 6,408,251 B1
(45) Date of Patent: Jun. 18, 2002

(54) CALIBRATING A MAGNETIC COMPASS WITH AN ANGULAR RATE GYROSCOPE AND A GLOBAL POSITIONING SYSTEM RECEIVER

(75) Inventor: Ronald Tadao Azuma, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/363,178

(22) Filed: Jul. 29, 1999

(51) Int. Cl.$^7$ .................. G01C 17/38; G01P 21/00; G06F 19/00
(52) U.S. Cl. ............................. 702/92; 701/224
(58) Field of Search .................... 702/92, 93, 104; 342/357.14, 357.06, 357.08, 457, 174; 701/224, 200, 214, 215, 221, 216, 300, 205, 206; 33/356, 272, 316–329; 73/1.16, 1.75, 1.77–1.78

(56) References Cited

U.S. PATENT DOCUMENTS

| | | | |
|---|---|---|---|
| 4,031,630 A | | 6/1977 | Fowler |
| 4,143,467 A | | 3/1979 | Erspamer et al. |
| 4,347,730 A | | 9/1982 | Fisher et al. |
| 4,743,913 A | | 5/1988 | Takai |
| 5,046,031 A | | 9/1991 | Wanous |
| 5,117,375 A | * | 5/1992 | Worcester et al. ............ 702/92 |
| 5,165,269 A | | 11/1992 | Nguyen |
| 5,235,514 A | | 8/1993 | Matsuzaki |
| 5,287,295 A | * | 2/1994 | Ives et al. .................... 702/92 |
| 5,339,246 A | * | 8/1994 | Kao ........................... 701/224 |
| 5,440,484 A | | 8/1995 | Kao |
| 5,761,094 A | | 6/1998 | Olson et al. |
| 5,890,099 A | * | 3/1999 | Abendroth .................. 702/94 |

OTHER PUBLICATIONS

"Digital Low–Pass Filter without Phase Shift," NASA Tech Briefs KSC–11471, John F. Kennedy Space Center, Florida.
William H. Press et al., "Numerical Recipes in C," *The Art of Scientific Computing*, Cambridge Univ. Press, pp. 309–317 (1988).

* cited by examiner

*Primary Examiner*—Marc S. Hoff
*Assistant Examiner*—Demetrius Pretlow
(74) *Attorney, Agent, or Firm*—Ladas & Parry

(57) ABSTRACT

A method and apparatus for calibrating an electronic compass of the type having a compass sensor, a calibration table and a display. A computer operating under program control is used to update the calibration table of the electronic compass in response to physical movement of at least the electronic compass sensor and an angular rate gyroscope through a 360 degree movement. A pointing device associated with the electronic compass is initially directed to a known landmark position and is also directed to the known landmark position after completing the 360 degree movement. The computer utilizes global positioning system receiver, the known landmark position and a heading provided by the sensor to generate a correction value. The output of the sensor is compared with data generated based upon the gyroscope during the 360 degree movement to generate correction values for other compass headings. The correction values are transmitted to the electronic compass for updating its calibration table.

14 Claims, 4 Drawing Sheets

CALIBRATING A MAGNETIC COMPASS WITH AN ANGULAR RATE GYROSCOPE AND A GLOBAL POSITIONING SYSTEM RECEIVER

STATEMENT OF GOVERNMENT INTEREST

This invention was made with government support under contract No. N00019-97-C-2013 awarded by the Defense Advanced Research Projects Agency (DARPA). The government has certain rights in this invention.

FIELD OF THE INVENTION

The present invention relates to a method and apparatus for calibrating an electronic compass.

BACKGROUND OF THE INVENTION

Electronic compasses have become rather ubiquitous these days. Today, many vehicles, including vehicles used by consumers, are supplied by their manufacturers with electronic compasses already installed. Additionally, electronic compasses certainly have military application and are used in military vehicles, including airborne, waterborne and terrestrial. Moreover, people on foot can use electronic compasses for recreational purposes, military purposes or other purposes. As such, electronic compasses have a wide range of applications.

An electronic compass is a device that indicates the yaw heading to an object by measuring the earth's magnetic field. For example, if the compass is a simple hand held device, the compass may have a simple pointing device to direct it towards the object in question. The compass then reads out the heading of whatever direction it happens to be pointing. If the compass is built into a vehicle, for example, the compass may simply read out the direction the vehicle is headed. If the compass is part of an optical system, then it reads out the direction the optical system is pointed.

Since the Earth's magnetic field is a weak field, and since metal objects distort that field, in general one must calibrate the output of an electronic compass to achieve reasonably accurate results. Classically, if the compass is a hand held or portable unit, this involves placing the compass on a mechanical device that rotates the compass to known orientations. Or, if the compass is disposed in a vehicle, this involves moving the vehicle (and its compass) in a circle. The compass output is recorded and compared against a known orientation, generating corrections to the compass output. A mechanical turntable can be used for this purpose when the compass is a hand held unit.

While this method is effective, it is laborious and slow, particularly if the electronic compass is meant to be accurate, since then more calibration data must be collected. The present invention provides a much faster, more automated solution to the problem of calibrating an electronic compass by using additional sensors. Instead of requiring 30 minutes with a mechanical turntable, the calibration operations can now be done in 2 minutes or less.

SUMMARY OF THE INVENTION

Brief and general terms the present invention provides a method and an apparatus for calibrating an electronic compass of the type having a compass sensor, a calibration table and a display. A computer operating under program control is preferably used to update the calibration table of the electronic compass in response to physical movement of at least the electronic compass sensor and an angular rate gyroscope through a 360 degree movement. A pointing device associated with the electronic compass is initially directed to a known landmark position and is also directed to the known landmark position after completing the 360 degree movement. The computer utilizes global positioning system receiver, the known landmark position and a heading provided by the sensor to generate a correction value. The output of the sensor is compared with data generated based upon the gyroscope during the 360 degree movement to generate correction values for other compass headings. The correction values are transmitted to the electronic compass for updating its calibration table.

BRIEF DESCRIPTION OF THE TABLES

Table I is a source code listing which implements the computer program for generating the calibration table; and Table II is a source code listing which implements the computer program for updating the calibration table.

DETAILED DESCRIPTION OF THE INVENTION

Figure 1:
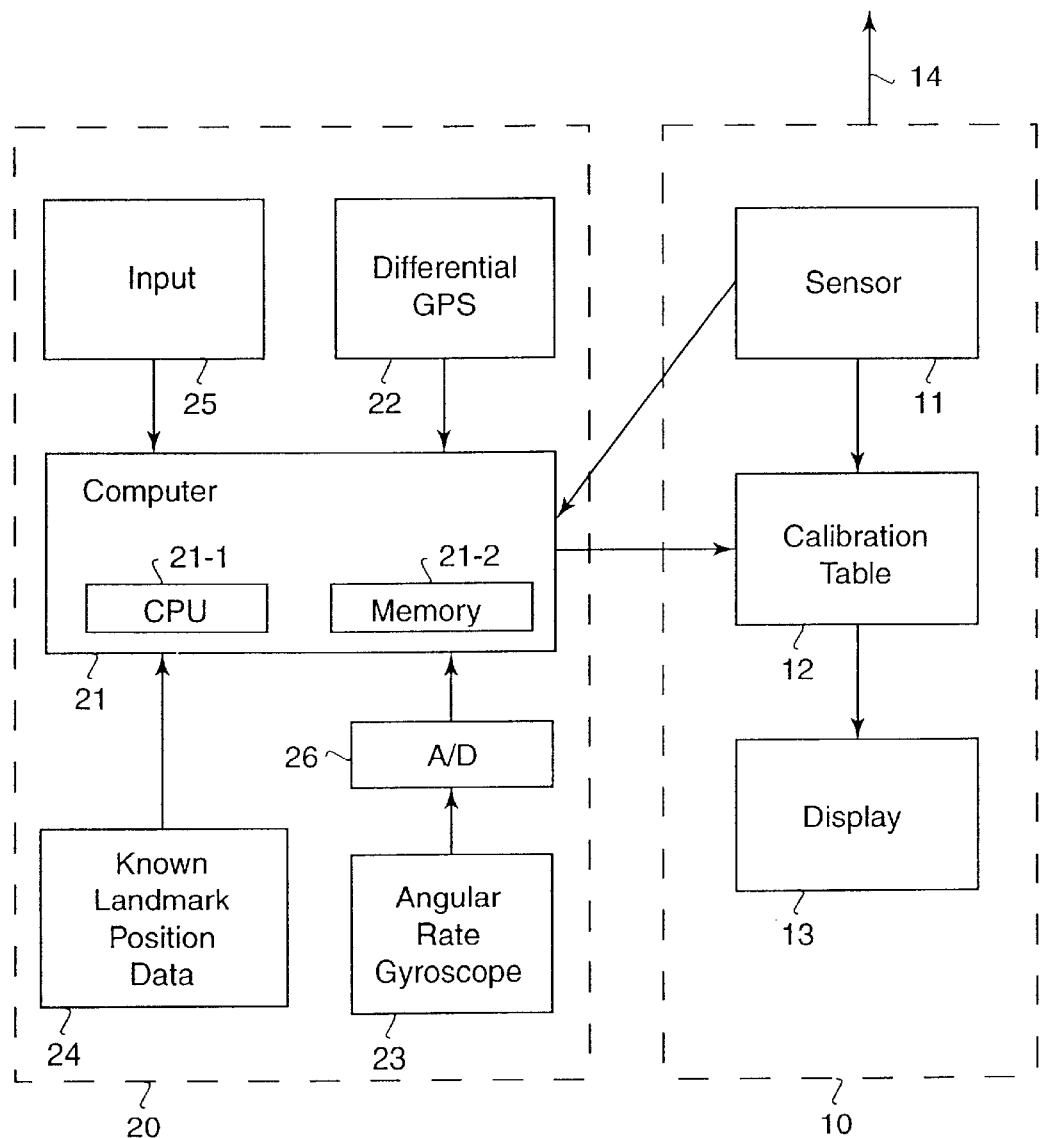
FIG. 1 is a block diagram showing an electronic compass and an apparatus for updating the calibration table associated with the electronic compass.
Figure 3:
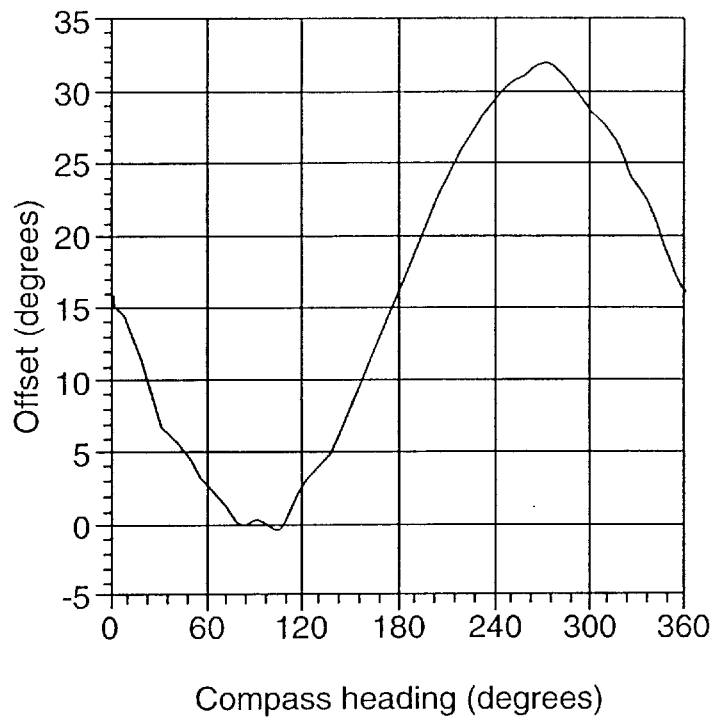
FIG. 3 is a graphic representation of exemplary data stored in the calibration table.

FIG. 1 is a block diagram of an electronic compass 10 and a calibration apparatus 20 for calibrating the electronic compass 10. The electronic compass 10 includes a magnetic field sensor 11, which might also be called an uncalibrated electronic compass 11. The output of the sensor 11 is applied to a calibration table 12 which corrects for metal objects that distort the field before the data is applied to a display 13 for displaying the true heading of the electronic compass. Those skilled in the art will realize, of course, that the calibration table 12 is normally stored in a memory and a suitable CPU (not shown) is provided for calibrating the raw data supplied by sensor 11 using table 12 for the purpose of updating display 13 to display the compass' true heading. The CPU, memory and related components are not shown since the details of the operation of an, electronic compass are well known and these details are not needed to understand the present invention. Exemplary data for a calibration table 12 is graphically depicted by FIG. 3.

The electronic compass 10 normally has some sort of pointing device 14 associated with it, particularly if the electronic compass is in the form of a hand held or portable unit. Obviously, if the electronic compass indicates that it is pointing due north, the person using the compass needs to have some sort of indicia to tell the user which way north is. The pointing device 14 in this case could be as simple as a scribe line on the compass, or it could be the primary axis of a vehicle in which the compass is installed or a reticle associated with an optical system, such a video camera, for example. Indeed, the optical system can be worn on or as part of the helmet of a soldier in the field and the pointing device may comprise a reticle formed in an optical device suspended over the one of the soldier's eyes. If the electronic compass 10 is mounted on a vehicle, then the pointing device might merely be the longitudinal axis of the normal direction of motion of the vehicle.

In one aspect, the present invention provides a calibrating device for calibrating the electronic compass 10. A preferred embodiment of the calibrating device 20 includes a programmed computer or computing device 21 including CPU 21-1 and the normal supporting components for the CPU, such as memory 21-2. The CPU 21-1, related components and memory 21-2 are collectively included within the block labelled with the numeral 21. The computer 21 receives (i) data corresponding to the uncalibrated output of the electronic compass from its sensor 11 (when the electronic compass 10 is being calibrated), (ii) the output of an angular rate gyroscope 23 and (iii) the output of a Global Positioning System (GPS) 22. Preferably, the GPS is a differential GPS which, as is well-known, provides greater positional accuracy information than does a non-differential GPS. While it is believed that the use of a differential GPS 22 is preferred, some practicing the present invention may choose instead to use a non-differential GPS in order to reduce the well known costs and/or added complications involved with using differential GPS's.

Figure 2:
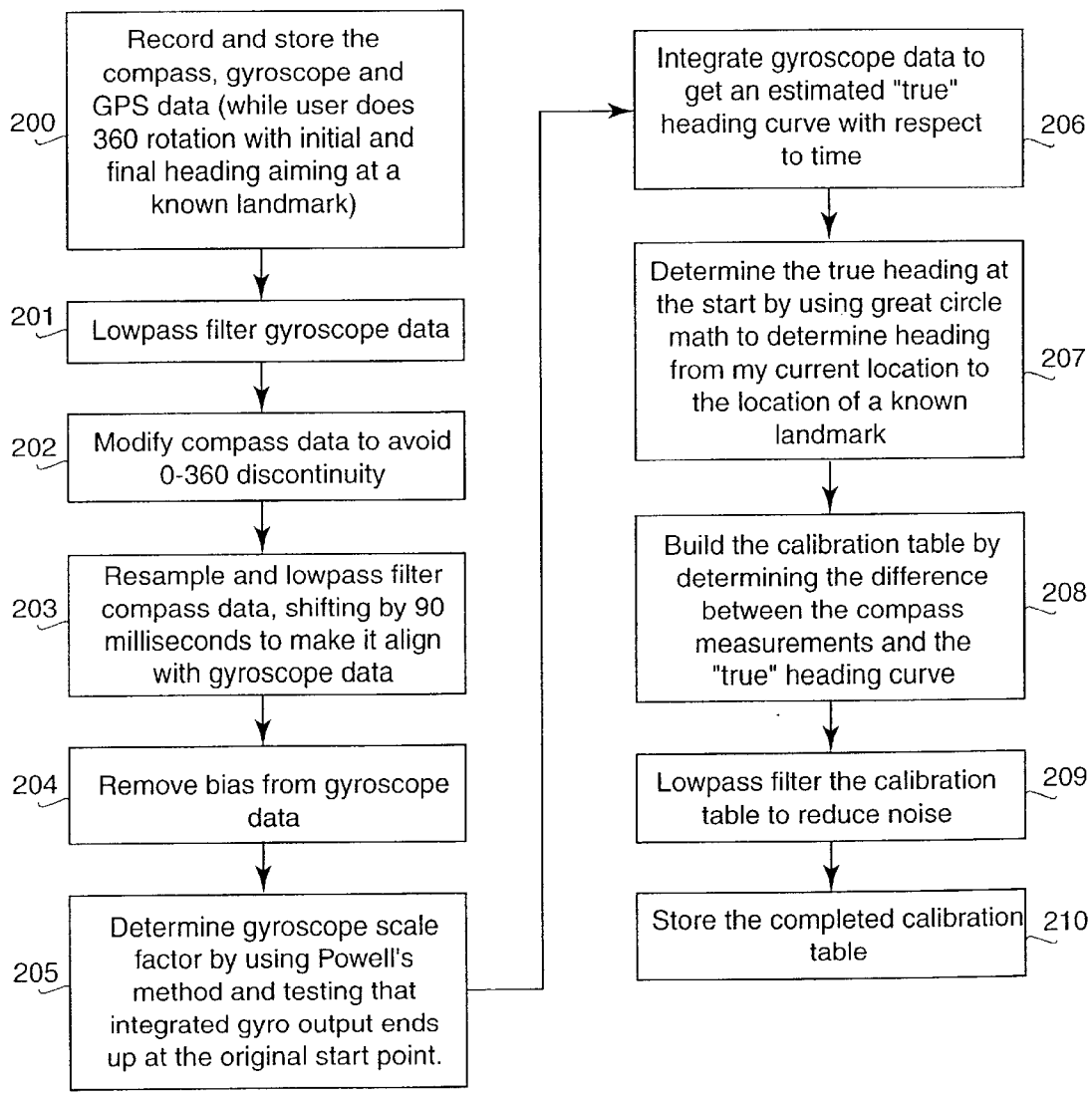
FIG. 2 is a flowchart of a computer program for generating the calibration table.

FIG. 2 is a flowchart of a program for use in CPU 21-1 for generating the calibration table and Table I is a source code listing of a computer program which implements the computer program flowcharted by FIG. 2.

In use, the location(s) 24 of one or more known landmarks in the environment are utilized. The positions of these one or more known landmarks are either previously stored in memory 21-2 or are entered into memory 21-2 at the time that the device 20 is utilized. Finally, a device, such as a button, for example, provides an input 25 to the computer 21 so that the computer can be advised or otherwise determine that the optical pointing device 14 is directed to a known landmark. The input 25 may be triggered by a button or may be provided by other data collection means.

The angular rate gyroscope 23 is oriented to detect the angular rotation rate along the same direction 14 that the compass senses (the yaw heading of the compass). The GPS receiver 22 measures the user's current location, reporting it as a latitude, longitude and altitude measurement. The input 25 may be provided simply a button which the user depresses in order to start date collection when the electronic compass 10 is aimed at a known landmark.

In order to calibrate the electronic compass 10, the user begins by aiming the compass 10 at a known landmark for which data is or has been stored in memory of the computer 21. The user provides an input 25 to the computer 21, preferably by pushing the aforementioned button, which signals the computer to start data collection (see step 200 in FIG. 2). The compass is preferably aimed using its pointing device 14. The data collection includes measuring the user's location through the GPS receiver 22 and it records the data from the compass 11 and the angular rate gyroscope 23 along with associated time stamps. Several GPS measurements are preferably taken to reduce noise through averaging.

The user slowly rotates the compass 10 together and at least the angular rate gyroscope 23 through a full 360 degree rotation, either clockwise or counterclockwise. A rotating platform may be conveniently used for this purpose or the device, especially if hand held, may be manually rotated through a full 360 degree rotation. The compass device 10 is preferably kept level so that the rotation preferably occurs in a plane whose axis points through the center of the earth. The gyroscope is arranged to sense this movement. The compass and gyroscope measurements are read out continuously during the 360 degree rotation until data collection is stopped. At the end of the rotation the user aligns the display again with the same landmark and hits the button again to stop the data collection. Preferably, the sensor 11 is read as fast as the device will accurately produce measurements. The compass 10 may be provided by a model TCM2-50 manufactured by Precision Navigation of Santa Rosa, Calif., USA in which case the sensor is then read at approximately 16 Hz. Of course, other electronic compasses and sensors may be utilized, if desired, as a matter of design choice. The angular rate gyroscope 23 is preferably sampled at 1 KHz. The speed of rotation of compass 10 is not particularly critical, although, in practice, a complete rotation will usually take 15 to 20 seconds. If the compass 10 is rotated through 360° too quickly, then accelerations and other inconsistencies during the rotation will introduce undesired errors. The angular rate gyroscope 23 may be provided by a model QRS14-500-103 manufactured by Systron Donner of Concord, Calif., USA. Of course, other models and types of angular rate gyroscopes may be used, if desired, as a matter of design choice.

The measured location of the compass (as provided by the GPS receiver 22), the known landmark position, and the compass and gyroscope data are utilized by the calibration program stored in computer 21 which uses that data to compute a new calibration table 12 which is uploaded into the calibration table 12 of electronic compass 10 and which is then used to correct the uncalibrated output of the magnetic field sensor 11. The GPS measurements may occur before, during and/or after the 360 degree rotation (so long as the position of the antenna of the GPS receiver 22 is not undergoing substantial translational movement). The calibration program should not require much time to run; it should finish in about 10–15 seconds on a 200 MHz Pentium PC. Thus, the total time required for performing the calibration is under 2 minutes.

If the electronic compass and the calibration equipment are mounted in a vehicle, then the vehicle may be driven in a circle as opposed to simply rotating the compass 10 and the angular rate gyroscope 23.

The calibration program works by performing the following additional steps:

1) Filter the gyro measurements: After collecting the data, the program preferably reduces noise in the angular rate gyroscope 23 output. This can be done by a variety of techniques, preferably by using a lowpass filter to filter the gyroscope data (see step 201 of the flowchart of FIG. 2). More preferably, a non-causal lowpass filter is utilized with a cut off frequency of 10 Hz. If a non-causal filter is utilized, no phase distortion is introduced into the output. A suitable filter is disdosed in: Digital Low-Pass Filter without Phase Shift, NASA Tech Briefs KSC-11471, John F. Kennedy Space Center, Florida, the disclosure of which is hereby incorporated in this reference. This filter is implemented in the software loaded into computer 21.

2) Filter and time stamp the compass measurements: A similar software lowpass filter is preferably applied to the recorded compass measurements, with the additional step of remapping the compass outputs to avoid discontinuities across the 0–360 degree boundary (see steps 202 and 203 of the flowchart in FIG. 2). The compass time stamps are preferably shifted by a period of time (for example, 90 milliseconds) to account for any latency difference between the gyroscope 23 and compass sensor 11.

3) Apply the bias and scale to the gyro measurements: The gyroscope 23 outputs are read through an A/D converter 26 in the form of raw counts. These are converted to angular rates in the form of degrees per second by applying both a bias and a scale value by computer 21 (see steps 204 and 205 of the flowchart in FIG. 2). The bias value is determined separately by letting the gyroscope sit still and averaging the output. The program than searches for a scale factor to apply. The initial and final headings should be the same, due to the user sighting the same landmark at the beginning and the end of the data collection. Integrating the gyroscope readings using the bias and a proposed scale value should end up with a full 360 degree rotation. The program running on computer 21 runs an optimization routine that searches for a scale factor that fulfills this constraint, by integrating the gyro data (see step #4). While different optimization routines can be used, the so-called Powell's method is preferably used to do the search. Powell's method is taught by "Numerical Recipes in C" published Cambridge University Press (1988), William H. Press; Brian P. Flannery; Saul A. Teukolsky and William T. Vetterling, authors, the disclosure of which is hereby incorporated herein by this reference.

4) Integrate gyro measurements: Given the bias and scale values for the gyroscope, the program in computer 21 integrates the angular rates to produce a set of headings that measure the difference from the initial base heading versus time (see step 206 of the flowchart in FIG. 2). This integration can be done in a variety of ways. Since the sampling rate is fast compared to the underlying motion, a simple Euler integration is preferably utilized. A more sophisticated integration could be used such as the 4th-order Runge-Kutta.

5) Compute the base heading: The base heading is both the initial and final heading of the data collection. This is determined by the user spotting a known landmark. The user's current location is measured by GPS receiver 22, which for high accuracy is preferably a differential GPS receiver. The landmark location is also known. Then the program computes the true heading from the user's current location to the landmark. This is done by using great circle geometries. See step 207.

6) Build a new calibration table: Given the base heading and the offset headings generated by integrating the gyroscope 23 measurements, a good measurement of what the headings were for the electronic compass 10 during the entire 360 degrees of motion can be computed (see step 208). These calculated true headings are compared against the filtered output of the magnetic field sensor 11. The differences become the values in the calibration table 12. The calibration table is normally calculated in a manner such that the values in the calibration table 12 are added to the magnetic field sensor 11 output to generate the true headings shown in display 13.

7) Filter the calibration table: A lowpass filter is preferably applied to the calibration table to remove noise (see step 209). Other similar smoothing approaches may be used instead.

Once a new calibration table is determined and uploaded into the electronic compass' table 12 at step 210, it is easy to utilize it to calibrate the raw data from sensor 11. An exemplary calibration table is shown graphically by FIG. 2, where the difference data is shown along the vertical axis and the raw sensor data is shown along the horizontal axis. For the exemplary data represented by FIG. 2, when the raw compass heading is due north as reported by sensor 11 outputting 0°, the difference data is 15.5° so the compass must actually be pointed at 0°+15.5° or 15.5°. When the raw compass heading is due west as reported by sensor 11 outputting 270°, the difference data is 32° so the compass must actually be pointed at 270°+32° or 302°. Of course the raw data from sensor 11 will typically not correspond to an exact entry in table 12. So, typically, the two closest values in the calibration are interpolated to generate an offset. Linear interpolation is preferably used but more complicated interpolation schemes could be applied. The offset is added to the raw compass measurement to generate a corrected output. Preferably the raw data is stored in table 12 in one degree spacings between offset values. The calibration table compensates for environmental factors, such as local disturbances in the magnetic fold and also for the magnetic declination due to the fact that the magnetic poll is not at the geographic pole.

Figure 5:
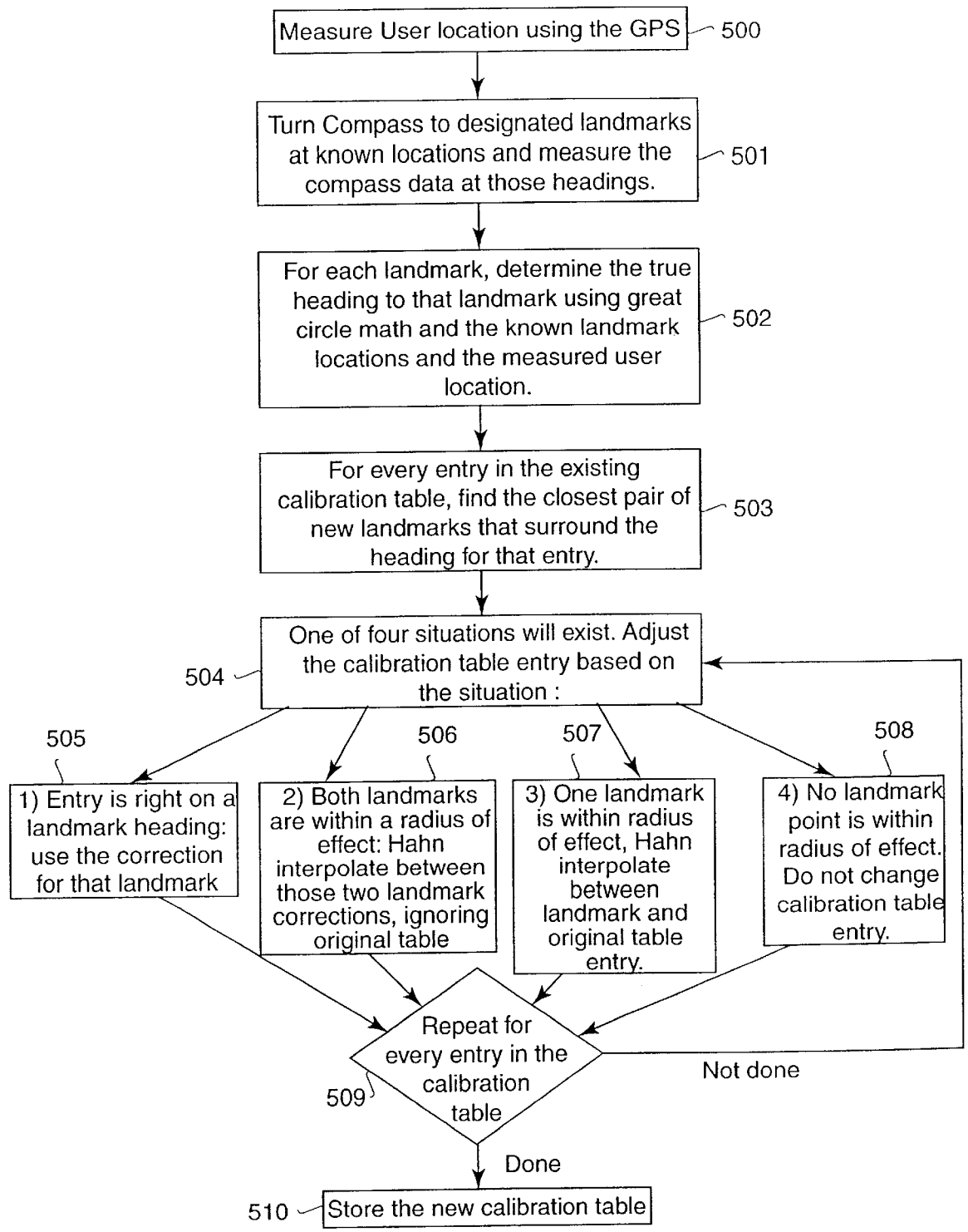
FIG. 5 is a flowchart of a computer program for updating the calibration table.

Once generated, a calibration table 12 can be locally corrected by sighting additional landmarks using a program corresponding to the flowchart of FIG. 5. This allows the table 12 to be modified somewhat to allow for changing conditions (such as the compass drifting with time) without the need to do a full recalibration. In order to perform a local correction, one or more known landmarks are sighted and the associated raw compass outputs when viewing those landmarks are recorded (see step 501). These landmark and compass measurement pairs are analyzed with the original calibration table. The true headings to the observed landmarks are computed as described in step 5, above, and as listed at step 502 of the flowchart of FIG. 5. Of course, the user's present location must be known (see step 500) in order to do the great circle math. The differences between these true headings and the headings computed by the original calibration table form a new set of offsets (at those particular headings).

For every entry in the existing calibration table, find the closest pair of new landmarks that surround the heading for that entry (see step 503). As a result of this analysis, four possible situations will occur for each entry in the calibration table. The calibration table entry is adjusted as indicated below based upon the situation (see step 504):

(1) Entry is right on a landmark heading; use the correction for that landmark. See step 505.

(2) Both landmarks are within a radius of effect; Hahn interpolate between those two landmark corrections, ignoring original table. See step 506.

(3) One landmark is within radius of effect, Hahn interpolate between landmark and original table entry. See step 507.

(4) No landmark point is within radius of effect. Do not change calibration table entry. See step 508.

These tests and corrections are repeated for each entry in the calibration table. See step 509. When completed, the new calibration table is stored in memory 12 (see step 510).

Figure 4:
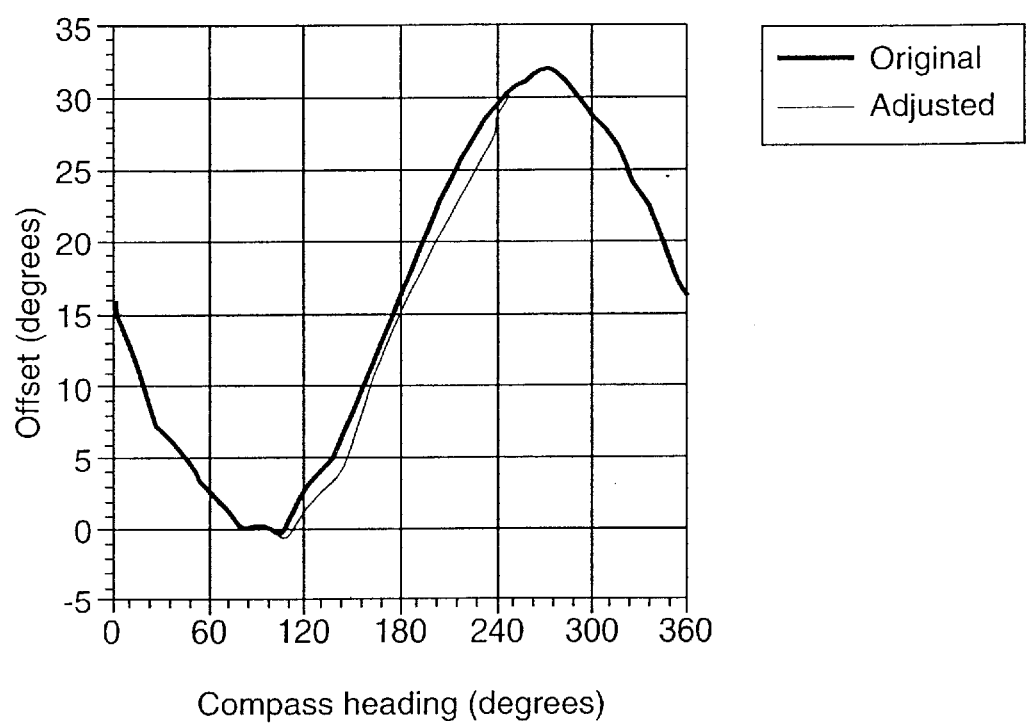
FIG. 4 is a graphic representation of exemplary data stored in the calibration table after being locally corrected by sighting additional landmarks.

In this way, these offsets are blended into the original table in a smooth way. Preferably each offset has a limited range of influence. At the heading were the landmark was observed, the new offset takes complete precedence (step 505). The new offset has less effect on table 12 as the heading moves away from the observation heading (step 507). After a certain separation distance (in degrees and preferably about 40°), the new offset has no effect on the table (step 508). This allows the new offset information to be smoothly blended into the original table. This smooth blending can be done in multiple ways, but preferably the Hahn window function is utilized to smoothly compute the fractional contribution of the new offsets (a value between 0 and 1). FIG. 4 shows an original calibration table and a modified calibration table with local corrections from sighting three additional landmarks.

Table II is a source code listing of a computer program which implements the computer program flowcharted in FIG. 5.

Having described the invention with a preferred embodiment thereof, modification may now suggest itself to those skilled in the art. As such, the invention is not to be limited to the disclosed apparatus or to the disclosed method except as required by the appended claims.

What is claimed is:

1. An apparatus for calibrating an electronic compass of a type having a compass sensor, a calibration table and a display, the calibration table calibrating data from the sensor before it is applied to the display, the calibration apparatus comprising:

a global positioning system receiver;

an angular rate gyroscope;

a computer operating under program control for updating the calibration table of the electronic compass in response to physical movement of at least the electronic compass sensor and the angular rate gyroscope through a 360 degree movement with a pointing device associated with the electronic compass being initially directed at the beginning of the movement to a known landmark position and also being directed to said known landmark position after completing the 360 degree movement, the computer utilizing the global positioning system receiver and the known landmark position to calculate a true heading of the electronic compass to the known landmark position, comparing that heading with the heading provided by the sensor to generate an associated correction and comparing an output of the sensor with data generated based upon the gyroscope during the 360 degree movement to generate corrections for other compass headings and transmitting the corrections to said electronic compass for updating its calibration table.

2. The apparatus of claim 1 wherein the global positioning system is a differential global position system.

3. The apparatus of claim 1 wherein the known landmark position is stored in a memory associated with said computer.

4. The apparatus of claim 3 wherein a plurality of known landmark positions are stored in said memory.

5. The apparatus of claim 1 wherein an analog to digital converter couples the gyroscope to said computer.

6. A method of calibrating an electronic compass of a type having a magnetic field sensor, a memory for a table of storing calibration data and a display for displaying a true heading of the compass as detected by the magnetic field sensor and corrected in accordance with data stored in the calibration table, said method comprising the steps of:

(a) aiming the electronic compass at a known landmark whose location is known;

(b) rotating the electronic compass together with at least an angular rate gyroscope through a full 360 degrees turn;

(c) collecting magnetic field sensor data and gyroscope data while the electronic compass and the angular rate gyroscope are being rotated;

(d) calculating the true heading of the electronic compass to the known landmark using (i) a known position of the electronic compass and (ii) the known position of the known landmark;

(e) calculating difference data based upon (i) a difference between the magnetic sensor data and a heading of the known landmark and (ii) for other compass headings using the magnetic sensor data, the heading of the known landmark and gyroscope data; and (f) supplying the calculated difference data to said electronic compass for storage as said calibration table.

7. The method of claim 6 further including storing the location of the known landmark in memory.

8. The method of claim 7 further including storing the locations of a plurality of known landmarks in memory.

9. The method of claim 6 wherein the known position of the electronic compass is determined by a global positioning system receiver.

10. The method of claim 9 wherein global positioning system receiver is a differential global positioning system receiver.

11. An apparatus for calibrating an electronic compass of a type having a compass sensor, a calibration table and a display, the calibration table calibrating data from the sensor before it is applied to the display, the calibration apparatus comprising a computer operating under program control for updating the calibration table of the electronic compass, a pointing device associated with the electronic compass being directed a first known landmark position, the computer recording a bearing of a first known landmark at the first known landmark position and comparing that recorded bearing with a calculated bearing based upon the known position of the first known landmark and a known position of the electronic compass, the pointing device associated with the electronic compass being directed a second known landmark position, the computer recording a bearing of a second known landmark at the second known landmark position and comparing that recorded bearing with a calculated bearing using the known position of the second known landmark, and updating each entry in the calibration table when the results of the comparison for a pair of closest known landmarks shows that the bearings of the pair of closest known landmarks are different than the calculated bearings of the pair of closest known landmarks, the computer interpolating between the pair of closest known landmark positions to update the calibration table for bearings between the pair of closest known landmarks.

12. The apparatus of claim 11 wherein the computer interpolates between the pair of closest known landmark positions only when the pair of closest known landmark positions are both within a predetermined range of effect.

13. The apparatus of claim 12 wherein the computer interpolates between only one of said pair of closest known landmark positions and an original entry in the calibration table when the other of said pair of closest known landmark positions is outside said predetermined range of effect.

14. The apparatus of claim 11 further including a global positioning system receiver for determining the known position of the electronic compass.

* * * * *